April 21, 1959  F. FERRISS ET AL  2,882,841
GARBAGE, TRASH AND SLUDGE DISPOSAL

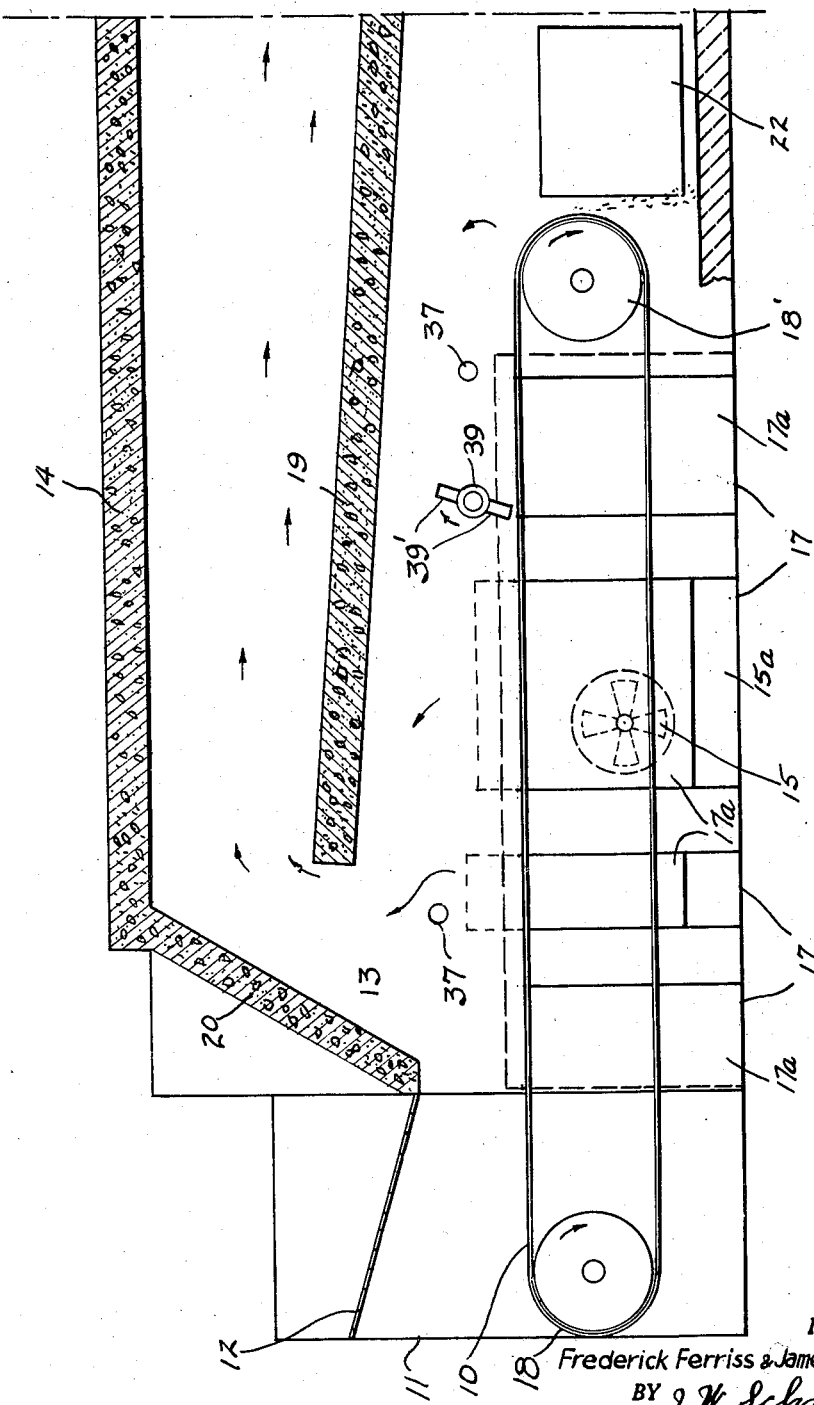

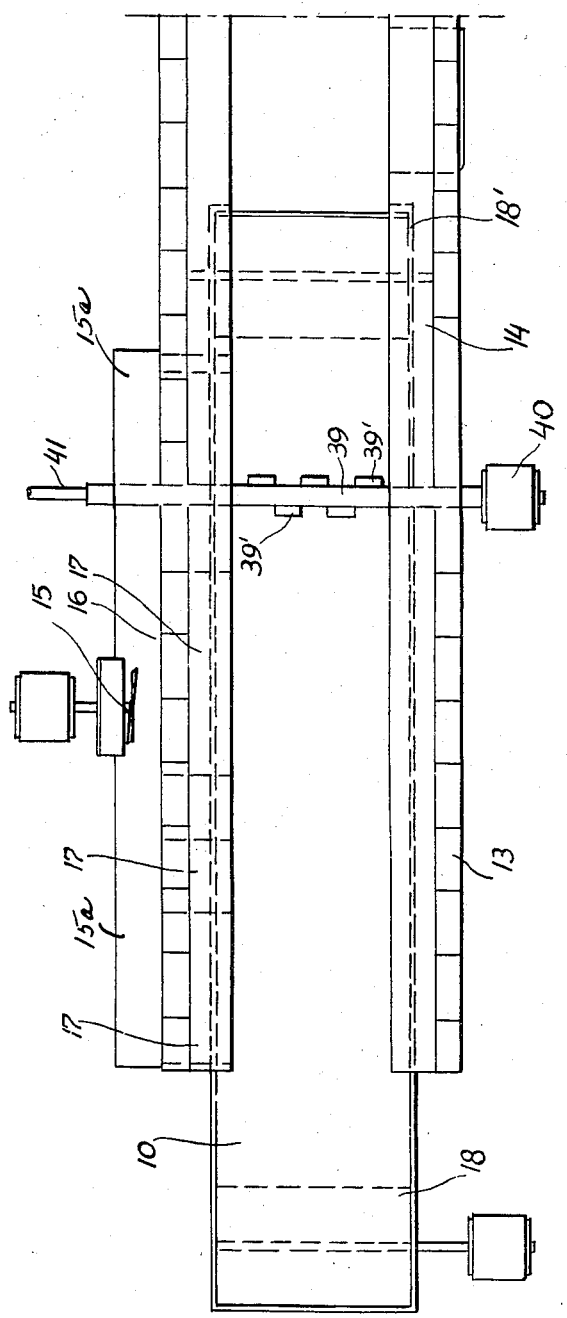

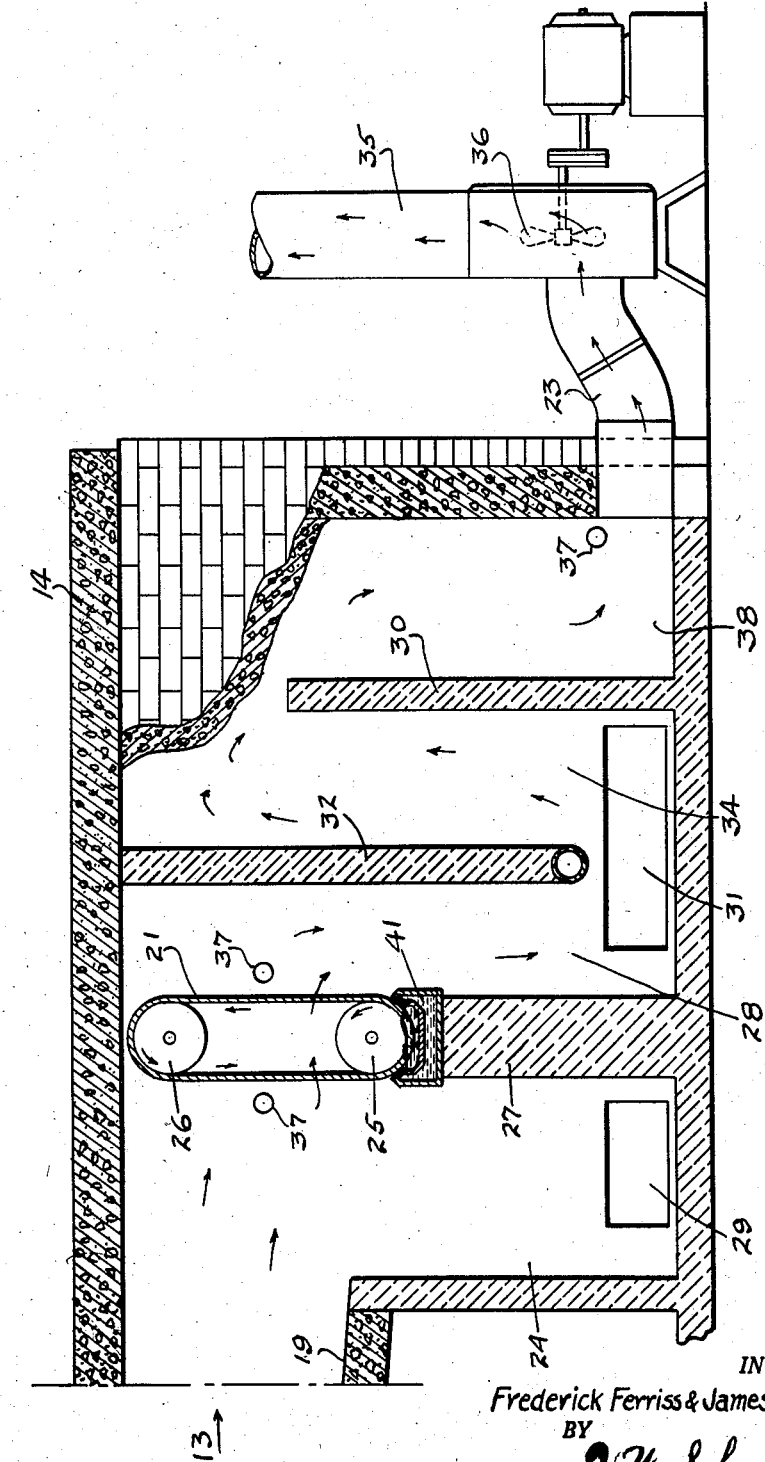

Filed July 3, 1956 5 Sheets-Sheet 4

INVENTOR.
Frederick Ferriss & James R. Gainfort
BY
J. W. Schmied
ATTORNEY

April 21, 1959 F. FERRISS ET AL 2,882,841
GARBAGE, TRASH AND SLUDGE DISPOSAL
Filed July 3, 1956 5 Sheets-Sheet 5

INVENTOR.
Frederick Ferriss & James R. Gainfort
BY
*J. W. Schmied*
ATTORNEY

United States Patent Office 2,882,841
Patented Apr. 21, 1959

2,882,841

GARBAGE, TRASH AND SLUDGE DISPOSAL

Frederick Ferriss, Morristown, N.J., and James R. Gainfort, Allentown, Pa.; said Gainfort assignor of 3.75 percent each to Frank L. Pinola, Kingston, William Brosch, Scranton, Gene Gasparini, Peckville, Pa., and the estate of Roy Francioni, deceased Application July 3, 1956, Serial No. 595,625

10 Claims. (Cl. 110—8)

This invention relates to improvements in apparatus and methods for the disposal of garbage, rubbish, sewage sludge and materials of similar characteristics.

In our copending United States patent application, Serial No. 544,882, filed November 4, 1955, we have described and illustrated apparatus and methods for the simultaneous incineration of garbage, trash, and sewage sludge in which the heated gases from combustion of the garbage and trash pass through a heat resistant multiperforate moving incinerating screen upon which screen the sludge is more or less uniformly deposited for drying and combustion of its combustible constituents.

An object of the present invention is to provide an alternative and improved method for introduction of the sludge into the path of the furnace gases and placing it upon the screen.

A feature of improvement is the provision of means for introducing the sludge in such manner as to maintain an air tight seal over the sludge at all times.

Other features are the more effective regulation of sludge ingress and more effective regulation of its distribution upon the screen hearth.

Other features are the use of means which permit recirculation of the sludge, if desired, and the constant circulation of a supply through either one furnace or a battery of furnaces until it is burned.

In accordance with exemplary embodiments a fire resistant pedestal within the furnace carries a heat resistant steel trough which extends across the furnace. The trough ends are at or just within the side walls of that part of the furnace which constitutes the exit passage for the gaseous products of combustion of the trash and garbage. The belt-like moving vertical screen passes over a roller which drains it and its bottom part dips into the trough almost or quite to the bottom thereof. The sludge is introduced into the trough through a suitable pipe by gravity flow, pumping or otherwise. The trough is water-jacketed and cooled by a continuous flow of water or other coolant. As the perforate belt is driven it picks up a layer of solids from the sludge which are carried into the drying and combustion zone of the hearth.

Further objects and advantages of the improvements set forth and claimed will appear from the following description of exemplary embodiments of apparatus according to the invention which are disclosed in connection with the accompanying drawings wherein:

Fig. 1 is a vertical cross section of the front or feed end of a disposal unit furnace including the improved elements set forth and claimed;

Fig. 1a is a plan view of the part of the furnace shown in Figure 1;

Fig. 2 is a central vertical cross section of the rearward portion of the furnace;

Figure 3:
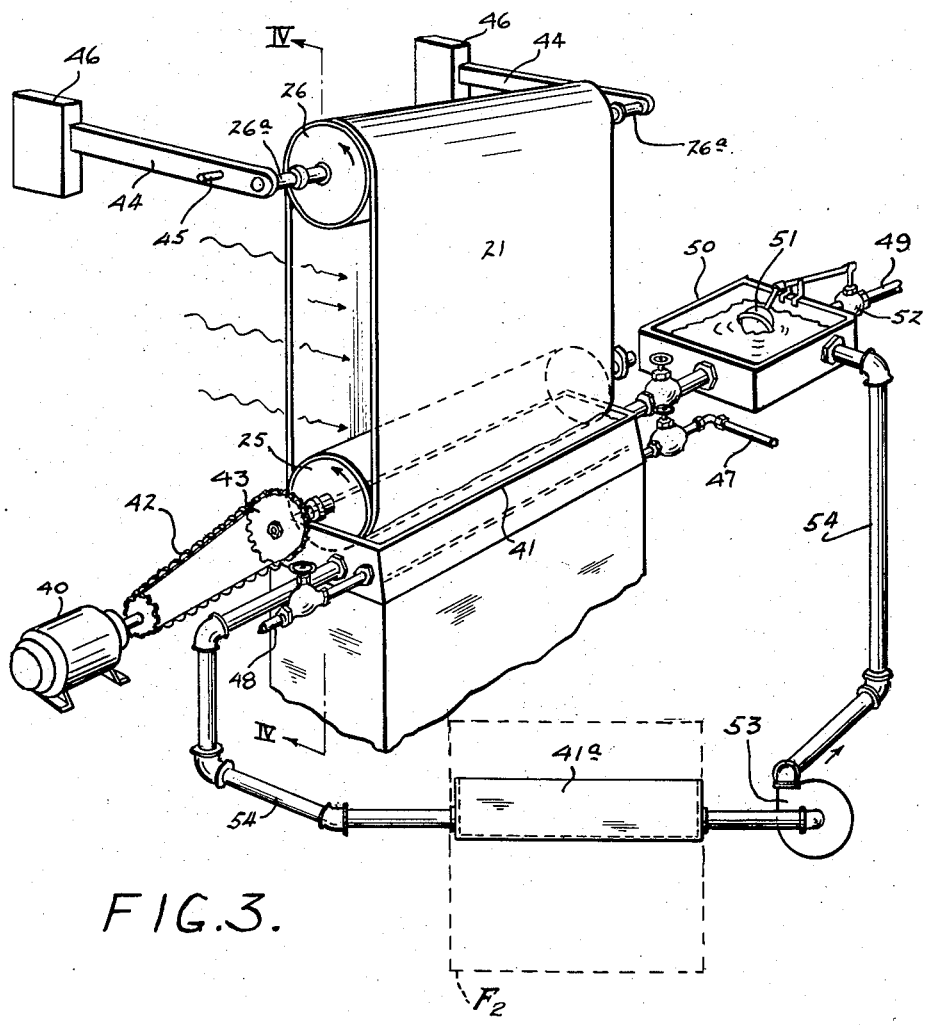
Fig. 3 is a somewhat idealized perspective of the heat resistant perforate belt with its driving means, the sludge trough, sludge supply means, and tension control means for the belt, with a dotted line indication of means for recirculating the sludge, keeping it in motion and passing it through a battery of one or more other furnaces.

In the exemplary embodiment disclosed herein the forward or front end of the furnace into which the garbage and rubbish is fed is disclosed in Fig. 1 and comprises a travelling grate or fuel support 10 adjacent to a feed opening 11 into which the garbage and rubbish material may be placed. A metal top plate 12 extends over the top of the feed opening and the feed opening is bounded on the sides by side plates. The travelling grate 10 is surrounded by a fire-brick or other suitable vitreous enclosure 13 of which the roof 14 may be composed of heat resistant concrete. A forced draft fan 15 forces air into a chamber 15a from whence it may be supplied under and through the grate 10 through air ducts 17, each of which may be wholly or partly closed by upwardly sliding doors 17a to regulate the supply of air to different parts of the grate 10. Two of the sliding doors are shown partly raised in open position. They may be held in any adjusted position by friction, latches (not shown) or by any suitable means. The grate 10 is of a known type composed of many links and is advanced by a power driven sprocket wheel 18 over an idler sprocket 18' at its rear end and is guided and supported at its sides by guides commonly used with such structures. Over the grate is a refractory reverberatory roof 19. The flames and hot gases pass in the direction of the arrows through the space between the element 19 and sloping portion of roof 20 and under the furnace roof 14 to the rearward portion of the furnace. Incombustible materials in the garbage and trash fall to the floor and may be removed through the door 22. A pit may be provided for reception of these materials, if desired. With adequately thorough combustion only the larger pieces of glass, metal, etc., remain unburned.

To facilitate combustion an automatic poker or stirrer is provided over the rear end of the moving hearth 10. This comprises a shaft 39 driven by a suitable motor or other driving means located outside of the furnace. On the shaft 39 are a number of heavy elongated lugs 39' arranged to stir the unburned residue (if any) on the grate 10 when it reaches the lugs 39'. The shaft 39 is in a zone of considerable heat and is preferably watercooled by water forced through an opening through its center.

The parts heretofore described and the details of their operation are more fully described in the specification of our copending U.S. patent application Serial No. 544,882, filed November 4, 1955, to which reference is made if any further information may be needed.

In said prior application means were disclosed for introducing sludge into the top of the rearward portion of the furnace. In accordance with a principal feature of the present invention, which is considered a modification of the invention of the former specification, the sludge is introduced into a trough extending across the furnace.

The rearward portion of the furnace as disclosed in Figure 2 comprises a continuation of the side walls 13 and the roof 14.

Hot gases from the forward end of the furnace enter from the left side of Fig. 2 between the roof 14 and the reverberatory top 19 of the main combustion chamber and are drawn through the heat resistant moveable chain belt 21 on their way to the pipe 23 which leads to the exhaust stack 35. The perforate chain belt 21 extends substantially entirely across the path of the hot gases.

Figure 4:
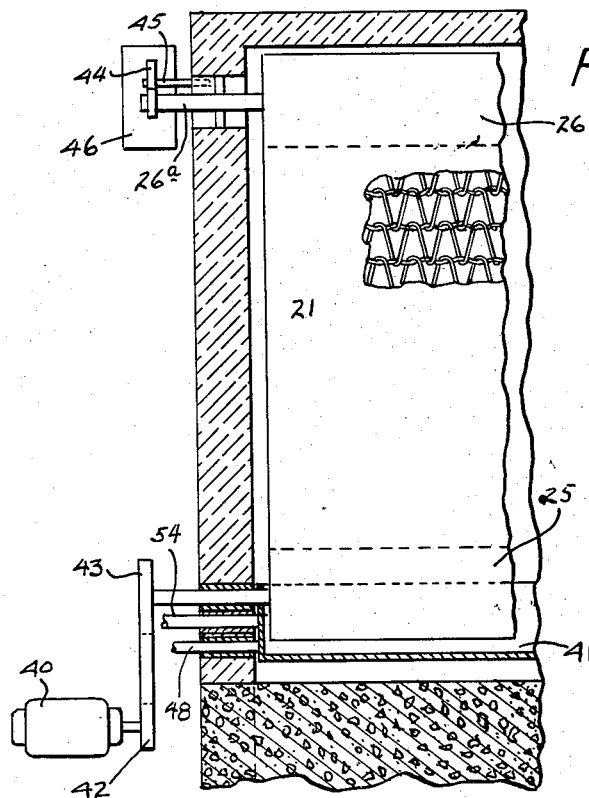
Fig. 4 is a vertical section of one side of the furnace on the line IV—IV of Fig. 3, looking to the left.

For simplicity the chain belt 21 is disclosed as a solid sheet; a few of the actual steel links of which it is composed are shown in detail in Figure 4.

The hot gases resulting from combustion of materials on the travelling grate 10 pass through both sides of the perforate chain belt 21 which consists of an endless chain belt composed of highly heat resistant steel links driven by driving pulley or roller 25 over an idler pulley or roller 26. In an exemplary embodiment the chain belt consists of a screen of heavy chrome nickel steel wire and contains many small openings which, in a typical case, may have dimensions of the order of 7 by 4 mm.

The bottom part of the belt 21 dips into a trough 41 kept supplied with sewage sludge by means hereinafter described.

A certain amount of flyash drops to the left of the belt 21 into a chamber 24.

The trough 41 is supported on a firebrick partition 27. Other chambers 28, 34 and 38 are formed by firebrick baffles 32 and 30. The baffle 32 is supported by a steel pipe 33 having its ends set in the sidewalls of the furnace. Flyash may be removed through doors such as 29 and 31, or other suitable openings, or allowed to drop into pits below the floor line of the furnace. These openings are closed by metal doors during operation. The chambers 24, 34 and 38 are of such dimensions that flue gases through them have a low velocity. The gases pass to the stack 35 through outlet pipe 23 and are driven by an induced draft fan 36. The speed of the fan and dimensions of the parts are so related to each other and to the forced draft fan 15 as to maintain a negative pressure of a few millimeters of mercury in the furnace. This prevents exit of smoke at the feed opening 11 and also prevents exit of smoke or flame at any one of a number of peep holes 37 which are provided at convenient points for visual observations of conditions within the furnace and especially the conditions at the chain hearth 21. These holes are normally closed by pivoted metal plates.

The chain belt 21 is driven at a steady rate or intermittently in small steps at a relatively low adjustable speed by a motor 40 (Figs. 3 and 4) and motion transmitting means 42 operating on a sprocket wheel 43 fixed to the axle of the drum 25 which extends through the wall of the furnace. The other end of the axle may be mounted on a bearing in the wall of the furnace. The idler drum 26 has its axles 26 so mounted that the drum is free to move up and down a short distance to keep the chain 21 tight as it expands or contracts with heating or cooling. Levers 44 are mounted on pins 45 and carry weights 46 to keep the chain adequately tight.

The trough 41 is provided with a water jacket and is kept cool by water flowing into it from an inlet pipe 47 and passing out through an outlet pipe 48.

Sludge is supplied from a pipe 49 into a level regulating trough 50 and its level is controlled by a level regulating float 51 acting on a valve 52 or by any other suitable means. Level regulation of the sludge may be manually accomplished, if desired.

The sludge supplied to the trough 41 may be kept in circulation by a pump 53 and a piping system 54 which returns the sludge to the tank 50. This circulatory piping is optional. If a battery of furnaces is to be operated simultaneously the sludge may be circulated through another trough like trough 41a in another furnace F2 before the excess unburned part is returned to the trough 41. This other trough like 41 with its attendant equipment is diagrammatically indicated at 41a.

In operation, the machinery for driving the various moving elements is set in motion and garbage and trash is supplied onto the front end of the hearth 10 and ignited. Feeding and burning are continued for some time until the interior of the furnace around the sludge drying and incinerating belt 21 is at or above 1800° F. This may usually be accomplished with the material collected by a municipal service without the use of supplemental fuels although the process may be expedited by the injection or use of a small amount of fuel oil by known means and methods.

With exceptionally wet garbage and trash, supplemental fuel may be necessary, but the usual material affords 4000 to 7000 B.t.u. per pound and gives sufficient surplus heat to dry the sludge which will burn and yield surplus heat when its water content is reduced below about 60% to 65%.

After the furnace is suitably hot the feed of sludge to the trough 41 is commenced. The speed of the incinerating chain belt 21 is suitably adjusted. As it moves through the trough 41 it picks up a layer of the sludge which rapidly dries as it rises from the trough and shortly begins to burn. At a suitable adjustment the combustible part of the sludge should be completely burned as it rises to the top of the furnace. The residue which is small and of mineral nature falls into one or another of the fly ash settling chambers 24, 28 and 34 and may be removed at the end of a day's run or at other suitable intervals.

Figure 5:
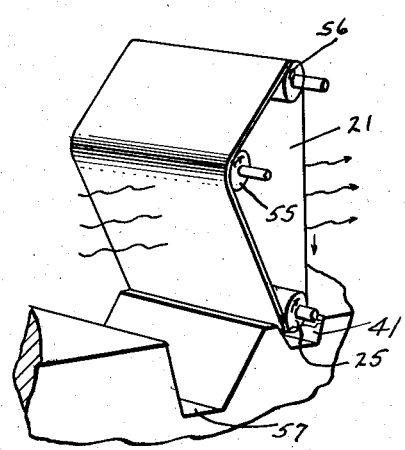
Figs. 5 and 6 are idealized perspectives of alternative mounting and driving arrangements for the moving screen belt.
Figure 6:
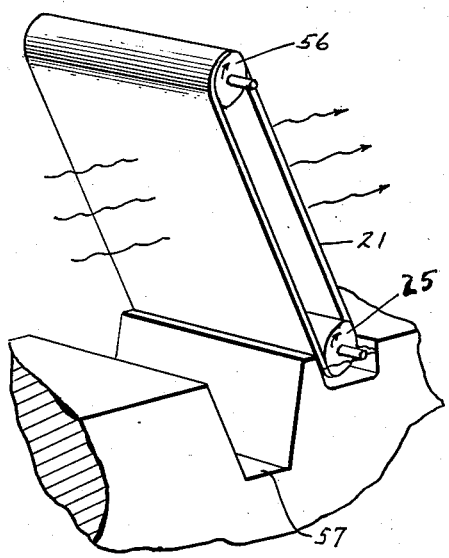

Figs. 5 and 6 show alternative constructions.

In the diagram of Fig. 5 the screen belt 21 has one drive roll 25 and operates over two idler rollers 55 and 56 in the direction of the arrows. A pit 57 serves to receive flyash. Sludge is supplied to the trough 41 (diagrammatically indicated) in the same manner as in the arrangement of Figs. 2 and 3. The flyash from the chain belt has a vertical free drop into the pit 57 and the area of the screen belt exposed to the heated flames and gases is increased.

In the diagram of Fig. 6 a single drive roll 25 and a single idler roll 56 are provided and the screen belt is slanted over the pit 57. Cleanout doors like those designated 29 in Fig. 2 may be provided in a similar manner.

In both Figs. 5 and 6 the upper rolls 56 may be adjustable as in Figs. 2 and 3 to maintain a proper tension on the screen belt.

The sloping chain hearth of Figure 6 is intended to typify slopes from a small angle with the horizontal to almost vertical as in Figure 2. The slopes of the various portions of Figure 5 may also be varied.

In all the arrangements herein disclosed the incinerating screen belt may be constructed of interwoven heavy chrome-nickel steel wire as disclosed in Figure 5 of the prior specification above named or in any suitable equivalent manner and operates generally in the same fashion to cause the drying and combustion of the combustible solids of the organic matter of the sludge. It assists in removing flyash from the exhaust gases of the burning rubbish when sludge is being burned as well as when it is not; it also breaks up the stratification of gases on their way to the stack and promotes more complete combustion.

Municipal wastes consisting of garbage, trash and sewage sludge are therefore disposed of without discharge of visible or otherwise objectionable gases into the atmosphere and with the production of only a relatively small bulk of essentially mineral residue.

Constructional details such as are well understood by those skilled in the art have been omitted from this simplified exemplary disclosure.

Having disclosed the invention by exemplification, what is claimed is:

1. A unit for drying and incinerating sewage sludge comprising a main furnace, means defining a passage for leading the gaseous products of combustion away from said furnace, a perforate heat resistant sludge burning metal screen extending across said passage, a reservoir for sludge, means for supplying sludge thereto, means for continually moving said screen through the sludge of said reservoir and carrying a layer of sludge therefrom into the path of said gaseous products and means for receiving the unburned residue of said sludge.

2. Arrangement according to claim 1, in which the reservoir is exposed to the heat of said gaseous products and having means for cooling the sludge of said reservoir while in the reservoir.

3. Arrangement according to claim 1, having means for supplying sludge to said reservoir and controlling the level thereof.

4. Arrangement according to claim 1, having means for maintaining a circulation of sludge through said reservoir.

5. Arrangement including a plurality of furnaces according to claim 1, having means for circulating the sludge through a plurality of sludge reservoirs.

6. Arrangement according to claim 1, wherein means is provided to move a portion of said screen in a path across the path of the exhaust gases but inclined at an angle to the direction of flow of said gases.

7. Arrangement according to claim 1, wherein the sludge burning metal screen is inclined at an angle to the vertical.

8. Arrangement according to claim 1, wherein the sludge burning metal screen is provided with rotating guiding and driving means including a roller having its axle extending beyond the furnace and tension regulating means acting on said roller which tension regulating means extends outside of the furnace.

9. A garbage, trash and sewage sludge disposal incinerator which comprises a fuel support for burning the garbage and trash, means defining an exit passage for the products of combustion, an induced draft means for drawing the products through said passage, a trough-like reservoir for sewage sludge below said passage, means including supply piping for feeding sludge to said reservoir, a heat resistant sludge burning perforate screen extending across said passage and dipping into said reservoir and means for continually driving said screen whereby the portion dipping into said reservoir is moved across said passage.

10. Apparatus for drying and burning essentially liquid sewage sludge comprising means for producing gaseous products of combustion at an incinerating temperature, walls defining a passage through which said products may travel, draft producing means for causing said travel, a multi-perforate heat resistant screen, a reservoir of sludge, means for moving said screen bodily through said reservoir to coat said screen with said sludge, and means for moving said coated screen across said passage whereby said coated screen is moved across said passage and said products of combustion are drawn through said screen in their course of travel through said passage.

References Cited in the file of this patent

UNITED STATES PATENTS

| | | |
|---|---|---|
| 239,722 | Cadwell | Apr. 5, 1881 |
| 339,389 | Denton | Apr. 6, 1886 |
| 537,796 | Altschul | Apr. 16, 1895 |
| 866,115 | Dock | Sept. 17, 1907 |
| 2,026,366 | Stehli | Dec. 31, 1935 |
| 2,045,115 | Allen et al. | June 23, 1936 |
| 2,064,953 | Serpas | Dec. 22, 1936 |
| 2,577,000 | Cift | Dec. 4, 1951 |

FOREIGN PATENTS

| | | |
|---|---|---|
| 97,320 | Sweden | Nov. 7, 1939 |